(12) United States Patent
Gärtner et al.

(10) Patent No.: US 12,735,354 B2
(45) Date of Patent: Sep. 15, 2026

(54) LOW VISCOSITY MILK OF LIME

(71) Applicant: S.A. Lhoist Recherche et Developpement, Ottignies-Louvainla-Nueve (BE)

(72) Inventors: Robert S. Gärtner, Buizingen (BE); Deborah A. Ballard, Fort Worth, TX (US); Kirsten Ballard, Fort Worth, TX (US)

(73) Assignee: S.A. Lhoist Recherche et Developpment, Ottingnies-Louvain-Nueve (BE)

( * ) Notice: Subject to any disclaimer, the term of this patent is extended or adjusted under 35 U.S.C. 154(b) by 452 days.

(21) Appl. No.: 18/558,093

(22) PCT Filed: May 5, 2022

(86) PCT No.: PCT/EP2022/062136
§ 371 (c)(1),
(2) Date: Oct. 30, 2023

(87) PCT Pub. No.: WO2022/234008
PCT Pub. Date: Nov. 10, 2022

(65) Prior Publication Data

US 2024/0199481 A1 Jun. 20, 2024

(30) Foreign Application Priority Data

May 6, 2021 (WO) ................ PCT/EP2021/062038

(51) Int. Cl.
*C04B 2/06* (2006.01)

(52) U.S. Cl.
CPC ..................................... *C04B 2/06* (2013.01)

(58) Field of Classification Search
None
See application file for complete search history.

(56) References Cited

U.S. PATENT DOCUMENTS 2,309,168 A * 1/1943 Corson ..................... C04B 2/04 422/162
2,560,016 A * 7/1951 Walker ...................... C04B 2/04 423/640
3,511,600 A * 5/1970 Kim .......................... C04B 2/04 106/35
5,275,650 A * 1/1994 Mongoin ........... C04B 24/2641 241/16

(Continued)

FOREIGN PATENT DOCUMENTS

FR 3048694 A1 * 9/2017 ............ C04B 28/10
WO WO-2020094607 A1 * 5/2020 ............. C01F 11/02

OTHER PUBLICATIONS

Derwent Abstract of FR 3048694 A1, “Manufacturing Milk of Lime of Great Fitness”, Criniere et al. (Year: 2017).*

*Primary Examiner* — John J Figueroa
(74) *Attorney, Agent, or Firm* — Charles D. Gunter, Jr.

(57) ABSTRACT

Low viscosity milk of lime comprising fine lime particles in suspension in an aqueous phase containing at least a first polymer dispersant and a second dispersant being either sodium gluconate or gluconic acid, mixture of sugar containing at least glucose and fructose, said low viscosity milk of lime showing a stable viscosity over 28 days lower than or equal to 600 mPa·s, preferably equal to or lower than 300 mPa·s.

9 Claims, 5 Drawing Sheets

(56) References Cited

U.S. PATENT DOCUMENTS

| | | | | |
|---|---|---|---|---|
| 2011/0000403 | A1* | 1/2011 | Tilquin | C01F 11/02<br>106/795 |
| 2013/0187087 | A1* | 7/2013 | Scheurman, III | C04B 2/06<br>252/192 |
| 2015/0183652 | A1* | 7/2015 | Gartner | B02C 17/20<br>516/88 |
| 2017/0152175 | A1* | 6/2017 | Kutlubay | C01F 11/02 |
| 2018/0065887 | A1* | 3/2018 | Ingram | C01F 11/02 |
| 2019/0092684 | A1* | 3/2019 | Criniere | C04B 2/08 |
| 2019/0367411 | A1* | 12/2019 | Kramadhati | B01J 20/041 |
| 2020/0308048 | A1* | 10/2020 | Chun | C04B 2/066 |
| 2022/0009831 | A1* | 1/2022 | Dewaghe | C01F 11/02 |

* cited by examiner

LOW VISCOSITY MILK OF LIME

The present invention relates to a low viscosity milk of lime even at high content of solids and high fineness. This lime suspension can be used for water treatment, such as drinking water, process water or wastewater treatment, for pH control such as for neutralization & precipitation in chemical, non-ferrous metallurgical & mining applications and processes, as well as in the pulp & paper industry.

High-reactive, concentrated, ready-to-use milk-of-lime or lime slurry (like Neutracal® SLS45) has become the reagent of choice for many applications in the aforementioned industries.

Next to the high reactivity, high solid content (>40 wt % solid content), low viscosity and improved other rheological properties, the customer appreciates also a low settling rate and an extended shelf-life.

Standard milk-of-lime produced either by slaking of quicklime or simple slurrying of "dry" hydrated lime powder does not have these advantageous properties. Suspensions of 40 wt % or greater in solid content cannot be industrially produced by direct slaking of quicklime, as the exothermic reaction of quicklime slaking will let the suspension boil, creating thus highly unstable and even hazardous reaction conditions. Conventional cooling is typically not efficient to reduce the reaction temperature below the boiling point. Either the quicklime has to be partially pre-hydrated or the quicklime mixed with hydrated lime (either in the form of lime slurry or dry hydrate) to achieve >40 wt % solids content. In practice, this is rarely done due to the relative complexity of the process compared to simple slurrying.

Regarding slurrying dry hydrated lime to achieve 40 wt % solid content or greater, the viscosity of such suspensions tends to be quite high, aggravated by the shear thinning & thixotropic rheology of concentrated lime slurry. Additionally, the viscosity of lime slurry is typically instable, i.e. increasing over time. This effect can be so severe, that well-flowable lime slurry can turn into a thick paste within days or even just hours.

It is known that the viscosity can be reduced by polymeric dispersants, typically polycarboxylate dispersants, especially polyether-polycarboxylate (PEC) dispersants, in which typically the polycarboxylate backbone is modified by polyether side chains, often in a comb co-polymer structure, see e.g. US 2014/0140907.

However these dispersants typically do not prevent a viscosity increase to a paste-like state over time. For stabilizing viscosity over time, it is further known to add polyalcohol additives, notably carbohydrates, including mono-, di-, oligo- and poly-saccharides, hydrogenated saccharides or sugar alcohols, sugar acids, e.g. so-called aldonic or uronic acids, such as e.g. gluconic acid or glucuronic acid, or their respective salts, or functionalized saccharides, such as N-acetyl-glucosamine or D-glucosamine, either alone, see e.g. WO 2007/11040, or in combination with a polycarboxylate dispersant, see e.g. WO 2006/050557, giving an additional benefit of reducing the viscosity.

Belgian Patent document BE1026329 B1 or international patent application WO2020/094607 further teaches, that the combination of carbohydrate additive, notably sucrose, and a polyether-polyacrylate dispersant such as certain Rheosperse dispersants available from Coatex SAS, can achieve low viscosity and limited viscosity increase over time, i.e. 14 days of storage under intermittent agitation (5 min/h), even for a hydrated lime, with low particles size.

Unfortunately, on one hand, as explained in this document, when the particle size distribution has a characteristic diameter $d_{99}$ around 15 μm and a characteristic average diameter de of about 2 μm, the viscosity of the milk of lime tends to increase over the acceptable limit (see last paragraph of the patent application). Sometimes, it is explained that this can be compensated by increasing the amount of both dispersants, but the economic feasibility of producing such a milk of lime then becomes questionable, due to the cost of the additives. Further, increasing the dispersants content increases the organic carbon content due to the organic nature of the dispersants, which can become then problematic for certain applications.

It is further to be noted that the viscosities of the aforementioned document are measured with a Thermo Fischer Rheostress 6000" with cryostat "Haake C 25" provided with a calibrated cylinder or spindle (rotor) "Haake Z 40" at a shear rate of 5 $s^{-1}$ and at 25° C. The shear rate of 5 $s^{-1}$ is quite high and has an impact on the viscosity measurement, due to the shear-thinning nature of milk of lime. Since high shear or high agitation intensity is applied during the measurement, this is reducing the observed viscosity. It should be understood that a viscosity measurement according the Brookfield method (esp. at a rate of 100 rpm) is likely to give a higher viscosity value.

On the other hand, as it can be seen from a close analysis of the examples, the viscosity is not stable over time, since increase in viscosity is observed even for the lowest solid concentrations.

For example, with a solid content of 40 wt % in the milk of lime according to example 3 (table 5 & 6), the viscosity increases by a factor of more than 2 times (from 103 to 246 mPa·s) or three times (from 221 to 751 mPa·s) depending on additive dosage.

At increased solid content (also Table 5 & 6) and increased fineness (Table 7), this increase over time becomes even more pronounced. A 60 wt % suspension with a very high additive dosage of 0.7 wt % polymer dispersant and 2 wt % sucrose increases in viscosity over 2 weeks from 320 mPa·s to 946 mPa·s. (Table 6). A 50 wt % suspension of ultrafine hydrate of $d_{50}$ of 1.9 μm and $d_{99}$ of 9.5 μm dosed with a high dosage of 1.5 wt % polymer dispersant and 1.5 wt % sucrose increases over the 2 week period from 305 mPa·s to 1305 mPa·s.

As it can be seen, according to Belgian Patent document BE1026329 B1 or international patent application WO2020/094607. while the viscosity increase can be limited by the described method of this document, the viscosity cannot be stabilized—and the required additive dosage is almost prohibitively high.

The present invention endeavors to solve at least a part of these drawbacks by providing a milk of lime of increased stability over time and where the carbon content is reduced.

To solve this problem, it is provided according to the present invention, a low viscosity milk of lime comprising fine lime particles in suspension in an aqueous phase containing at least a first dispersant and a second dispersant, said fine lime particles having a particle size distribution with a characteristic diameter $d_{25}$ equal to or lower than 2 μm as measured by laser diffraction with methanol as carrier solvent, said milk of lime containing a fine lime particles content comprised between 30 and 75 wt %, wherein the first dispersant is a dispersant polymer present at an amount of 0.03 to 0.24 wt % non-volatile matter, preferably between 0.04 to 0.20 wt %, preferably lower than or equal to 0.18 wt % or even lower than or equal to 0.16 wt % non-volatile matter with respect to the solid matter content of the low viscosity milk of lime, and wherein the second dispersant is present at an amount of 0.10 to 1.0 wt % non-volatile matter, preferably between 0.12 and 0.85 wt % non-volatile matter, more particularly between 0.15 and 0.8 wt % non-volatile matter with respect to the total weight of the low viscosity milk of lime and comprises either (i) sodium gluconate or gluconic acid, (ii) a mixture of sugar containing at least glucose and fructose, (iii) xylitol, wherein said first dispersant and said second dispersant are present together at an amount comprised between 0.11 and 1.15 wt %, preferably between 0.15 and 1.1 wt %, more particularly between 0.25 and 0.95 wt % non-volatile matter with respect to the total weight of the low viscosity milk of lime, said low viscosity milk of lime showing a stable viscosity over 28 days lower than or equal to 600 mPa·s, preferably equal to or lower than 300 mPa·s, as measured by a Brookfield DV III Rheometer", with the suitable spindle according to the observed torque or viscosity, typically LV spindle No 3. at 100 rpm with the measurement taken on the 30th second after the rheometer motor was turned on.

As can be seen, the milk of lime according to the present invention shows a stable viscosity over 28 days lower than or equal to 600 mPa·s, preferably lower than or equal to 300 mPa·s while showing a polymer dispersant content, which is low, i.e. comprised between 0.03 to 0.24 wt % non-volatile matter, preferably between 0.04 to 0.20 wt %, preferably lower than or equal to 0.18 wt % or even lower than or equal to 0.16 wt % non-volatile matter with respect to the solid matter content of the low viscosity milk of lime, when using a selected carbohydrate in limited amount.

Indeed, it has been found according to the present invention, that either sodium gluconate or gluconic acid, xylitol or a mixture of saccharides, containing at least glucose and fructose, present at an amount comprised between 0.10 to 1.0 wt % non-volatile matter, preferably between 0.12 and 0.85 wt % non-volatile matter, more particularly between 0.15 and 0.8 wt % non-volatile matter with respect to the total weight of the low viscosity milk of lime together with a polymer dispersant, added to fine hydrate suspension, allows to reach a milk of lime with low viscosity over several weeks, at least 4 weeks, i.e. 28 days in addition to a reduced consumption of polymer dispersant, but also of carbohydrate dispersant in some cases since the total amount of the first dispersant and the second dispersant is comprised between 0.11 and 1.15 wt %, preferably between 0.15 and 1.1 wt %, more particularly between 0.25 and 0.95 wt % non-volatile matter with respect to the total weight of the low viscosity milk of lime.

It has been surprisingly found, that it is possible to prepare a milk of lime with a viscosity remaining below 600 mPa·s, preferably below 300 mPa·s, for weeks without having to compromise on the purity of the milk of lime. The milk of lime according to the present invention has indeed multiple advantages, notably to provide a milk of lime with reduced organic carbon content, but also with a reduced cost.

Indeed, a milk of lime is a mineral product, which is appreciated by the industries using it for its mineral nature and the addition of organic-carbon-containing additives is often seen as a negative aspect by the customer. According to the present invention, the content of organic compounds, i.e. the polymer dispersant, but also the carbohydrate dispersant, is reduced. Further, reducing the polymer dispersant reduces also the costs of the final product. As expressed in Belgian Patent document BE1026329B1 or international patent application WO2020/094607, the costs of polymer dispersant even when used in a limited amount such as 0.5% to 1.5% is significant with respect to the total cost of the milk of lime, which is typically seen as a commodity product. Being able to reduce the content of the polymer dispersant to a value such as between 0.03 to 0.24 wt % non-volatile matter, preferably between 0.04 to 0.20 wt %, preferably lower than or equal to 0.18 wt % or even lower than or equal to 0.16 wt % non-volatile matter, i.e. non-volatile dispersant component per weight solid content of the milk-of-lime is thus a significant improvement.

According to the present invention, the fine lime particles in the milk of lime have a particle size distribution with a characteristic diameter $d_{25}$ equal to or lower than 2 μm as measured by laser diffraction with methanol as carrier solvent.

For the avoidance of any doubt and as commonly adopted in the art, it is understood in the invention that $d_x$ (in μm) of a size distribution refers to the size at which x % in volume of the distribution is below the size dx.

Preferably, the fine lime particles size distribution are measured using internal ultrasound for dispersion, in particular during 2 minutes, notably with a power of maximum 73 W. This can be for example performed using a Beckmann-Coulter Diffraction Particle Sizer LS 13 320. Advantageously, the fine lime particles in the milk of lime according to the present invention have a particle size distribution with a characteristic diameter do lower than or equal to 4 μm as measured by laser diffraction with methanol as carrier solvent, such as for example of 3.5 μm.

Preferably, the fine lime particles in the milk of lime according to the present invention have a particle size distribution with a characteristic diameter do lower than or equal to 15 μm as measured by laser diffraction with methanol as carrier solvent.

In a preferred embodiment, the fine lime particles in the milk of lime according to the present invention have a particle size distribution with a $d_{98}$ lower than or equal to 90 μm, preferably lower than or equal to 60 μm, more preferably lower than or equal to 40 μm and more particularly lower than or equal to 20 μm measured by laser diffraction in methanol.

According to the present invention, when the second dispersant is sodium gluconate or gluconic acid, it is advantageously in an amount comprised between 0.2 and 0.75 wt %, preferably between 0.25 and 0.5 wt % and advantageously around 0.3 wt % with respect to the total weight of the low viscosity milk of lime.

According to the present invention, when the second dispersant is a mixture containing at least glucose and fructose, the total amount of glucose and fructose combined is present at an amount comprised between 0.2 and 0.5 wt %, preferably comprised between 0.25 and 0.4 wt % and advantageously around 0.3 wt % with respect to the total weight of the low viscosity milk of lime.

According to the present invention, when the second dispersant is xylitol, it is advantageously in an amount comprised between 0.2 and 0.75 wt %, preferably between 0.35 and 0.6 wt % with respect to the total weight of the low viscosity milk of lime.

Of course, the milk of lime according to the present invention contains just a limited amount of dispersants required to maintain the viscosity below 600 mPa·s, and preferably, below 300 mPa·s. The limited amount of dispersants is the total of the amount of the first dispersant and of the amount of the second dispersant. The limited total amount of dispersant according to the present invention is preferably below or equal to 0.9 wt %, preferably lower than or equal to 0.8 wt %, more preferably equal to or lower than 0.7 wt %, 0.6 wt % or even equal to or lower than 0.5 wt %, such as for example below 0.4 or even below 0.3 wt % with respect to the weight of the milk of lime.

The total of the amount of the first dispersant and the second dispersant is the required amount to provide a viscosity lower than or equal to 600 mP·s over about 4 weeks. Of course, it is contemplated according to the present patent application that a further dispersant can be used without going outside of the scope of this patent application.

Similarly, the mixture of glucose and fructose according to the present invention can be a syrup of several sugars, such as made by a mixture of 3, 4 or even 5 sugars, provided the syrup contains at least fructose and glucose and the syrup is added to the milk of lime in such a way the content of fructose and glucose in the milk of lime is comprised between 0.10 to 1.0 wt % non-volatile matter, preferably between 0.12 and 0.85 wt % non-volatile matter, more particularly between 0.15 and 0.8 wt % non-volatile matter. In some case, the syrup is a syrup of invert sugar.

In an advantageous embodiment, the fine lime particles in the milk of lime according to the present invention have a specific surface area measured by nitrogen adsorption manometry and calculated according to the BET (Brunauer, Emmett et Teller) method lower than or equal to 12 $m^2/g$, preferably lower than or equal to 10 $m^2/g$, more preferably lower than or equal to 8 $m^2/g$ and most preferably lower than or equal to 6 $m^2/g$.

In another advantageous embodiment, the low viscosity milk of lime according to any of the precedent claims has a density comprised between 1.3 $kg/dm^3$ and 1.4 $kg/dm^3$.

In one other embodiment, the first dispersant is a polycarboxylic polyether copolymer.

In a further typical embodiment, the polycarboxylic polyether copolymer has a main chain containing (meth) acrylate units and lateral chains comprising oxyethylene or oxypropylene groups.

In a particular embodiment according to the present invention, the fine particle content is higher than 40 wt %, preferably higher than 45 wt %, preferably higher than 50 wt % with respect to the total weight of the low viscosity milk of lime Other embodiments of the low viscosity milk of lime according to the present invention are mentioned in the appended claims Other characteristics and advantages of the present invention will be derived from the non-limitative following description, and by making reference to the figures and examples.

Figure 1:
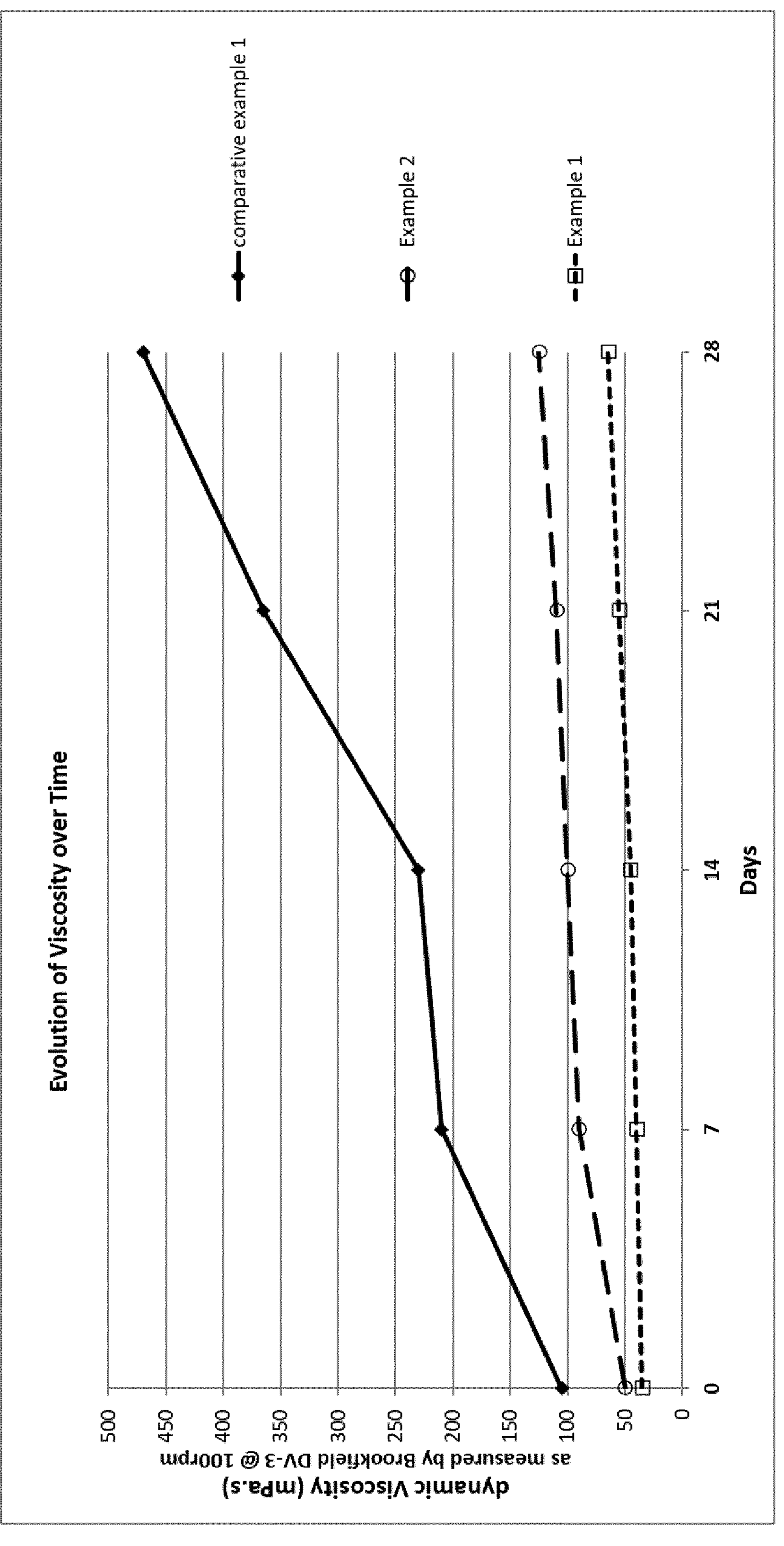
FIG. 1 is a graphic representation of the viscosity evolution over time of the milk if lime containing different amounts of a mixture of fructose and glucose with a polymer dispersant.

The present invention relates to a low viscosity milk of lime showing a viscosity over 28 days lower than or equal to 600 mPa·s, more preferably lower or equal to 300 mPa·s, therefore having improved storage properties.

The low viscosity milk of lime according to the present invention comprises fine lime particles in suspension in an aqueous phase with at least a first dispersant and a second dispersant, said fine lime particles having a particle size distribution with a characteristic diameter $d_{25}$ equal to or lower than 2 μm as measured by laser diffraction with methanol as carrier solvent.

The low viscosity milk of lime contains typically a fine lime particles content comprised between 30 and 75 wt %. The first dispersant is a dispersant polymer, preferably a polycarboxylate polyether copolymer and preferably a poly (meth)acrylate polyether copolymer with oxyethylene and/or oxypropylene units in the lateral side-chains on a polycarboxylate backbone. The first dispersant is typically a comb copolymer. The first dispersant is present at an amount of 0.03 to 0.24 wt % non-volatile matter, preferably between 0.04 to 0.20 wt %, preferably lower than or equal to 0.18 wt % or even lower than or equal to 0.16 wt % non-volatile matter with respect to the solid matter content of the low viscosity milk of lime.

The second dispersant is present at an amount of 0.11 and 1.15 wt %, preferably between 0.15 and 1.1 wt %, more particularly between 0.25 and 0.95 wt % non-volatile matter with respect to the total weight of the low viscosity milk of lime and comprises either:

(i) sodium gluconate or gluconic acid, (ii) a mixture of sugar containing at least glucose and fructose, (iii) xylitol.

In the milk of lime according to the present invention, the first dispersant and the second dispersant are present together at an amount comprised between 0.11 and 1.15 wt %, preferably between 0.15 and 1.1 wt %, more particularly between 0.25 and 0.95 wt % non-volatile matter with respect to the total weight of the low viscosity milk of lime.

The low viscosity milk of lime shows a stable viscosity over 28 days lower than or equal to 600 mPa·s, more preferably lower or equal to 300 mPa·s, as measured by a Brookfield DV III Rheometer", with the suitable spindle according to the observed torque or viscosity, typically LV spindle No 3. at 100 rpm with the measurement taken on the 30th second after the rheometer motor was turned on.

The milk of lime according to the present invention shows a stable viscosity over 28 days lower than or equal to 600 mPa·s, more preferably lower or equal to 300 mPa·s, while showing a polymer dispersant content which is especially low, i.e. comprised between 0.03 to 0.24 wt % non-volatile matter with respect to the solid matter content of the low viscosity milk of lime, when using a selection of carbohydrates in limited amounts.

Indeed, it has been identified according to the present invention that either sodium gluconate or gluconic acid, xylitol or a mixture of saccharides containing at least glucose and fructose in an amount comprised between 0.10 to 1.0 wt % non-volatile matter, preferably between 0.12 and 0.85 wt % non-volatile matter, more particularly between 0.15 and 0.8 wt % non-volatile matter with respect to the total weight of the low viscosity milk of lime together with a polymer dispersant added to fine hydrate suspension allows to reach a milk of lime with low viscosity over several weeks, at least for 4 weeks, i.e. 28 days, in addition to a reduced consumption of polymer dispersant but also of carbohydrate dispersant in some cases, since the total amount of the first dispersant and the second dispersant is comprised between 0.11 and 1.15 wt %, preferably between 0.15 and 1.1 wt %, more particularly between 0.25 and 0.95 wt % non-volatile matter with respect to the weight of the low viscosity milk of lime.

The choice of the second dispersant selected between sodium gluconate or gluconic acid, xylitol or a mixture of sugar containing at least glucose and fructose, combined with the other features of the invention, allows to produce such slurries at much reduced additive dosage and better reproducibility. Accordingly, the slurries can be produced more cost efficiently and provide less organic adjuvants to the final use. In the case the slurries are used in water treatment, the slurries also reduce the chemical oxygen demand since any organic carbon source acts as nutrient for undesired microbial growth of the application treatment where the product is finally used). Further, the choice of hydrated lime—a hydrated lime having a specific surface area measured by nitrogen adsorption manometry and calculated according to the BET (Brunauer. Emmett et Teller) method lower than or equal to 12 $m^2/g$, preferably lower than or equal to 10 $m^2/g$, more preferably lower than or equal to 8 $m^2/g$ and most preferably lower than or equal to 6 $m^2/g$, produces a less viscous & more stable suspension—especially for the same dosage of carbohydrate & polymer dispersant.

According to the present invention, the first and the second dispersant can be added in different stages or together.

EXAMPLES

The particle size distribution in the following examples and comparative examples were measured with a Beckmann-Coulter Diffraction Particle Sizer LS 13 320 by laser diffraction with methanol as carrier solvent, using internal ultrasound for dispersion during 2 minutes with a power of maximum 73 W.

Example 1.—Preparation of a Milk of Lime Containing 0.08 Wt % Polymer Dispersant and 0.2 wt % Fructose and Glucose A milk of lime containing 45 wt % fine hydrated lime particles with respect to the weight of the milk of lime, 0.08 wt % non-volatile matter with respect to the weight of the milk of lime of Neomere®Tech 646 from Chryso SAS, i.e. a polycarboxylate polyether copolymer as second dispersant polymer and 0.2 wt % non-volatile matter of fructose and glucose with respect to the weight of the milk of lime added as first dispersant, i.e. an organic stabilizing agent, as a syrup made of 3 sugars is prepared. The syrup contains fructose, glucose and sucrose at a ratio 1/1/1 and present a sugar content of 66% sugar and 34% water. The syrup is added at an amount of 0.68 wt % to reach a final amount of glucose and fructose in the milk of lime of 0.2 wt %

The milk of lime is prepared as follows:

2000 g of tap water are placed in a 5 $dm^3$ plastic beaker. 18.5 g invert sugar syrup with a dissolved, total carbohydrate content of 70 wt %, containing sucrose, fructose and glucose in equal amounts, are added to the water and dissolved by gentle agitation with a 3-bladed propeller stirrer, turning at 300 rpm during 15 min.

1636 g dry lime hydrate with a BET specific surface area of 10.3 $m^2/g$ is added to the water and dispersed by the same gentle agitation during 30 min into a homogeneous suspension of 45% wt solid content with respect to the weight of the milk of lime. The added hydrated lime particles have a particle size distribution with characteristic diameters as follows: $d_{25}$ of 2.5 μm, $d_{50}$ of 9.9 μm, $d_{90}$ of 55.3 μm and $d_{98}$ of 99.8 μm.

The suspension is milled by a lab scale rotary bead mill with a (empty) volume of 1.4 $dm^3$ using yttrium-stabilized zirconium oxide beads with a mean diameter of 1.2 mm to obtain fine hydrated lime particles with a particle size distribution with characteristic diameters as follows: $d_{25}$ of 1.14 μm, $d_{50}$ of 2.74 μm, $d_{90}$ of 12.7 μm and a $d_{98}$ of 27.3 μm.

To 2132 g of this suspension, 8.5 g of Chryso Neomere® Tech 646 are added under vigorous agitation with the same stirrer as above at 600 rpm for a concentration of 0.080 wt % non-volatile matter of Neomere®Tech 646 per mass of total suspension.

The viscosity is measured by Brookfield DV-3 Rheometer at 100 rpm with the measurement taken on the $30^{th}$ second after the viscometer motor was turned on. The used 200 $cm^3$ sample is only shaken by hand for homogenization before the measurement but left otherwise undisturbed. Results over 28 days are given in FIG. 1.

Example 2.—Preparation of a Milk of Lime Containing 0.08 wt % Polymer Dispersant and 0.135 wt % Fructose and Glucose 2000 g of tap water are placed in a 5 $dm^3$ plastic beaker. 10.5 g said sugar syrup of Example 1 with a dissolved, total carbohydrate content of 70 wt %, containing sucrose, fructose and glucose in equal amounts, are added to the water and dissolved by gentle agitation with a 3-bladed propeller stirrer, turning at 300 rpm during 15 min.

1636 g of the same dry hydrated lime particles as Example 1 with a BET specific surface area of 10.3 $m^2/g$ is added to the water and dispersed by the same gentle agitation during 30 min into a homogeneous suspension of 45 wt % solid content. The added dry hydrated lime particles have particle size distribution with characteristic diameters as follows: $d_{25}$ of 2.5 μm, $d_{50}$ of 9.9 μm, $d_{90}$ of 55.3 μm and $d_{98}$ of 99.8 μm.

The suspension is milled by a lab scale rotary bead mill with a (empty) volume of 1.4 $dm^3$ using yttrium-stabilized zirconium oxide beads with a mean diameter of 1.2 mm to obtain fine hydrated lime particles with a particle size distribution with characteristic diameters as follows: $d_{25}$ of 1.16 μm, $d_{50}$ of 2.82 μm, a $d_{90}$ of 12.6 μm and a $d_{98}$ of 25.3 μm.

To 2290 g of this suspension, 9.2 g of Chryso Neomere®Tech 646 are added under vigorous agitation with the same stirrer as above at 600 rpm for a concentration of 0.080 wt % non-volatile matter of Neomere®Tech 646 per mass of total suspension.

The viscosity is measured by Brookfield DV-3 Rheometer at 100 rpm with the measurement taken on the $30^{th}$ second after the viscometer motor was turned on. The used 200 $cm^3$ sample is only shaken by hand for homogenization before the measurement, but left otherwise undisturbed. Results over 28 days are given in FIG. 1.

Example 3.—Preparation of a Milk of Lime Containing 0.225 wt % Gluconate Na and 0.08 wt % Polymer Dispersant 5000 g of tap water are placed in a 10 $dm^3$ plastic beaker. 20.5 g dry sodium gluconate (p.a. quality of Sigma-Aldrich) are added to the water and dissolved by gentle agitation with a 3-bladed propeller stirrer, turning at 300 rpm during 15 min.

4091 g of dry hydrated lime particles a with a BET specific surface area of 7.9 $m^2/g$ is added to the water and dispersed by the same gentle agitation during 30 min into a homogeneous suspension of 45 wt % solid content. The added dry hydrated lime particles have a particle size distribution with characteristic diameters as follows: $d_{25}$ of 2.0 μm, $d_{50}$ of 5.0 μm, $d_{90}$ of 51.9 μm and $d_{98}$ of 122.2 μm.

The suspension is milled by a lab scale rotary bead mill with a (empty) volume of 1.4 $dm^3$ using yttrium-stabilized zirconium oxide beads with a mean diameter of 1.2 mm to obtain fine hydrated lime particles with a particle size distribution with characteristic diameters as follows; $d_{25}$ of 1.38 μm, $d_{50}$ of 2.78 μm, $d_{90}$ of 7.43 μm and $d_{98}$ of 10.56 μm.

Figure 3:
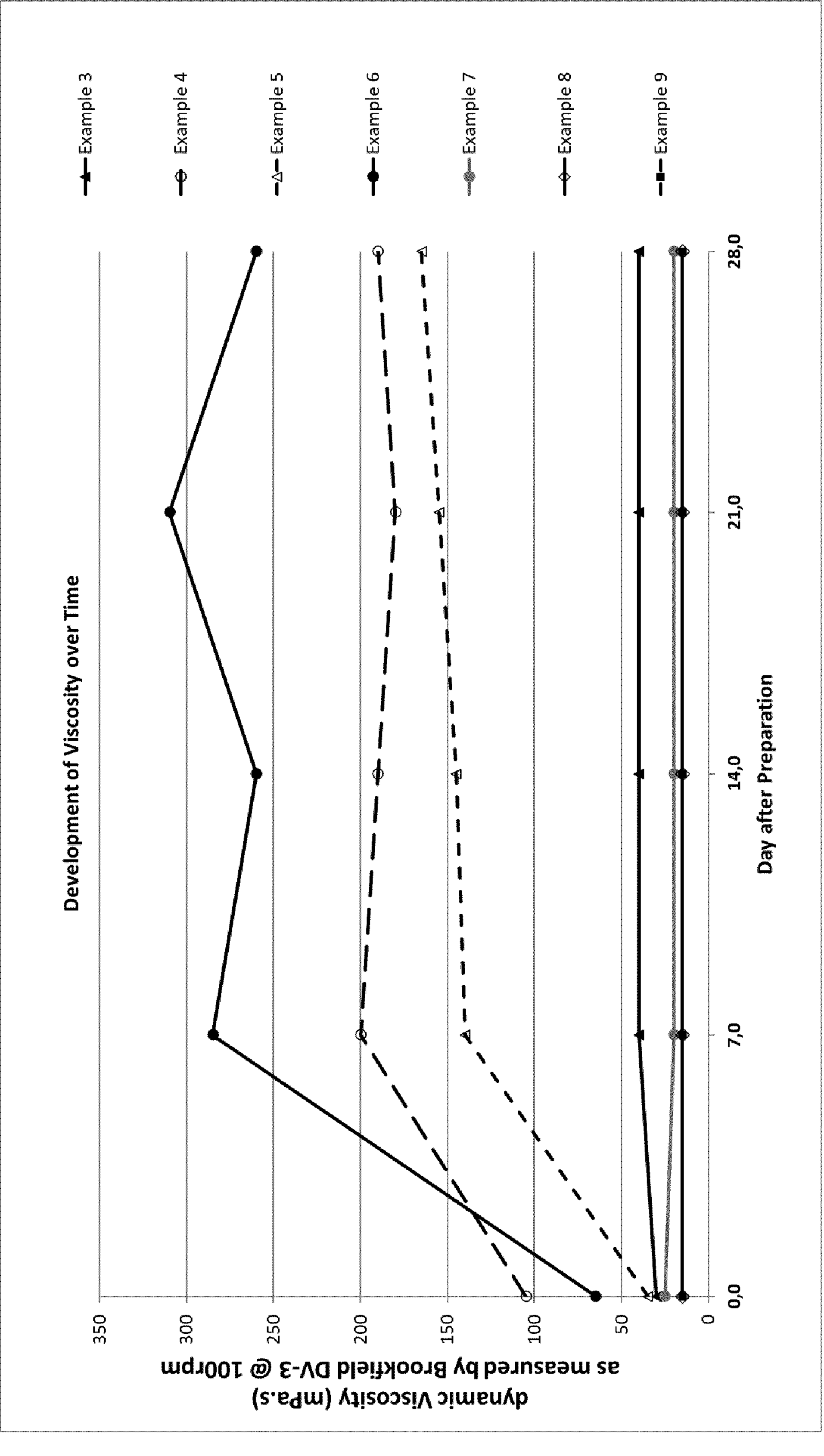
FIG. 3 is a graphic representation of the viscosity evolution over time of the milk if lime containing different amounts of sodium gluconate with a polymer dispersant.

To 2560 g of this suspension, 10.2 g of Chryso Neomere®Tech 646 are added under vigorous agitation with the same stirrer as above at 700 rpm for a concentration of 0.08 wt % non-volatile matter of Neomere®Tech 646 per mass of total suspension. The viscosity is measured by Brookfield DV-3 Rheometer at 100 rpm with the measurement taken on the 30th second after the rheometer motor was turned on. The used 200 $cm^3$ sample is only shaken by hand for homogenization before the measurement, but left otherwise undisturbed. Results over 28 days are given in FIG. 3.

Example 4.—Preparation of a Milk of Lime Containing 0.225 wt % Sodium Gluconate and 0.04 wt % Polymer Dispersant The same milled suspension as in Example 4 is used.

To 2220 g of this suspension, 4.4 g of Chryso Neomere®Ttech 646 are added under vigorous agitation with the same stirrer as above at 700 rpm for a concentration of 0.04 wt % non-volatile matter of Neomere®Tech 646 per mass of total suspension (with respect to the weight of the milk of lime).

The viscosity is measured by Brookfield DV-3 Rheometer at 100 rpm with the measurement taken on the $30^{th}$ second after the viscometer motor was turned on. The used 200 $cm^3$ sample is only shaken by hand for homogenization before the measurement, but left otherwise undisturbed. Results over 28 days are given in FIG. 3.

Example 5.—Preparation of a Milk of Lime Containing 0.135 wt % Sodium Gluconate and 0.08 wt % Polymer Dispersant 5000 g of tap water are placed in a 10 $dm^3$ plastic beaker. 12.3 g dry sodium gluconate (p.a. quality of Sigma-Aldrich) are added to the water and dissolved by gentle agitation with a 3-bladed propeller stirrer, turning at 300 rpm (during 15 min.

4091 g of the same dry lime hydrate as in Example 3 & 4 with a BET specific surface area of 7.9 $m^2/g$ is added to the water and dispersed by the same gentle agitation during 30 min into a homogeneous suspension of 45 wt % solid content with respect to the weight of the milk of lime. The added hydrated lime particles have a particle size distribution with characteristic diameters as follows: $d_{25}$ of 2.0 μm, $d_{50}$ of 5.0 μm, $d_{90}$ of 51.9 μm and $d_{98}$ of 122.2 μm.

The suspension is milled by a lab scale rotary bead mill with a (empty) volume of 1.4 $dm^3$ using yttrium-stabilized zirconium oxide beads with a mean diameter of 1.2 mm to obtain a particle size distribution of the hydrated lime particles with characteristic diameters such as follows: $d_{25}$ of 1.50 μm, $d_{50}$ of 3.17 μm, $d_{90}$ of 9.03 μm and $d_{98}$ of 13.80 μm.

To 2167 g of this suspension, 8.7 g of Chryso Neomere®Tech 646 are added under vigorous agitation with the same stirrer as above at 700 rpm for a concentration of 0.08 wt % non-volatile matter of Neomere®Tech 646 per mass of total suspension.

The viscosity is measured by Brookfield DV-3 Rheometer at 100 rpm with the measurement taken on the $30^{th}$ second after the rheometer motor was turned on. The used 200 $cm^3$ sample is only shaken by hand for homogenization before the measurement, but left otherwise undisturbed. Results over 28 days are given in FIG. 3.

Example 6.—Preparation of a Milk of Lime Containing 0.135 wt % Sodium Gluconate and 0.08 wt % Polymer Dispersant The same milled suspension as in Example 5 is used. To 2422 g of this suspension, 4.8 g of Coatex Rheosperse 4050 are added under vigorous agitation with the same stirrer as above at 700 rpm for a concentration of 0.08 wt % non-volatile matter of Rheosperse 4050 per mass of total suspension (with respect to the weight of the milk of lime). The viscosity is measured by Brookfield DV-3 Rheometer at 100 rpm with the measurement taken on the $30^{th}$ second after the rheometer motor was turned on. The used 200 $cm^3$ sample is only shaken by hand for homogenization before the measurement, but left otherwise undisturbed. Results over 28 days are given in FIG. 3.

Example 7.—Preparation of a Milk of Lime Containing 0.3375 wt % Sodium Gluconate and 0.08 wt % Polymer Dispersant 5000 g of tap water are placed in a 10 $dm^3$ plastic beaker. 30.7 g dry sodium gluconate (p.a. quality of Sigma-Aldrich) are added to the water and dissolved by gentle agitation with a 3-bladed propeller stirrer, turning at 300 rpm during 15 min.

4091 g of the same dry hydrated lime particles as in Example 3 to 6 with a BET specific surface area of 7.9 $m^2/g$ is added to the water and dispersed by the same gentle agitation during 30 min into a homogeneous suspension of 45 wt % solid content. The content of sodium gluconate is thus 0.75 wt % per weight dry hydrate (with respect to the weight of the fine hydrated lime particles) or 0.3375 wt % per wt suspension (with respect to the weight of the milk of lime). The added dry hydrated lime particles have a particle size distribution with characteristic diameter as follows: $d_{25}$ of 2.0 μm, $d_{50}$ of 5.0 μm, $d_9$% of 51.9 μm and a $d_{98}$ of 122.2 μm.

The suspension is milled by a lab scale rotary bead mill with a (empty) volume of 1.4 $dm^3$ using yttrium-stabilized zirconium oxide beads with a mean diameter of 1.2 mm to obtain a fine hydrated lime particles with a particle size distribution with characteristic diameter such as follows: $d_{25}$ of 1.30 μm, $d_{50}$ of 2.58 μm, $d_{90}$ of 8.59 μm and $d_{98}$ of 10.18 μm.

To 2309 g of this suspension, 9.2 g of Chryso Neomere®Tech 646 are added under vigorous agitation with the same stirrer as above at 700 rpm for a concentration of 0.08 wt % non-volatile matter of Neomere®Tech 646 per mass of total suspension.

The viscosity is measured by Brookfield DV-3 Rheometer at 100 rpm with the measurement taken on the $30^{th}$ second after the rheometer motor was turned on. The used 200 $cm^3$ sample is only shaken by hand for homogenization before the measurement, but left otherwise undisturbed. Results over 28 days are given in FIG. 3.

Example 8.—Preparation of a Milk of Lime Containing 0.3375 wt % Sodium Gluconate and 0.12 wt. Polymer Dispersant The same milled suspension as for Example 7 is used.

To 2047 g of this suspension, 12.3 g of Chryso Neomere®Tech 646 are added under vigorous agitation with the same stirrer as above at 700 rpm for a concentration of 0.12 wt % non-volatile matter of Neomere®Tech 646 per mass of total suspension (with respect to the weight of the milk of lime).

The viscosity is measured by Brookfield DV-3 Rheometer at 100 rpm with the measurement taken on the 30$^{th}$ second after the rheometer motor was turned on. The used 200 $cm^3$ sample is only shaken by hand for homogenization before the measurement, but left otherwise undisturbed. Results over 28 days are given in FIG. 3.

Example 9.—Preparation of a Milk of Lime Containing 0.3375 wt % Sodium Gluconate and 0.16 wt % Polymer Dispersant The same milled suspension as in Example 7 is used.

To 2060 g of this suspension, 8.2 g of Coatex Rheosperse 4050 are added under vigorous agitation with the same stirrer as above at 700 rpm for a concentration of 0.16 wt % non-volatile matter of Coatex Rheosperse 4050 per mass of total suspension (with respect to the weight of the milk of lime).

The viscosity is measured by Brookfield DV-3 Rheometer at 100 rpm with the measurement taken on the 30$^{th}$ second after the rheometer motor was turned on. The used 200 $cm^3$ sample is only shaken by hand for homogenization before the measurement, but left otherwise undisturbed. Results over 28 days are given in FIG. 3.

Example 10.—Preparation of a Milk of Lime Containing 0.3375 wt % Xylitol and 0.16 wt % Polymer Dispersant The same milled suspension as for Example 7 is used.

To 2177 g of this suspension, 8.7 g of Coatex Rheosperse 4050 are added under vigorous agitation with the same stirrer as above at 700 rpm for a concentration of 0.16 wt % non-volatile matter of Coatex Rheosperse 4050 per mass of total suspension (with respect to the weight of the milk of lime).

Figure 2:
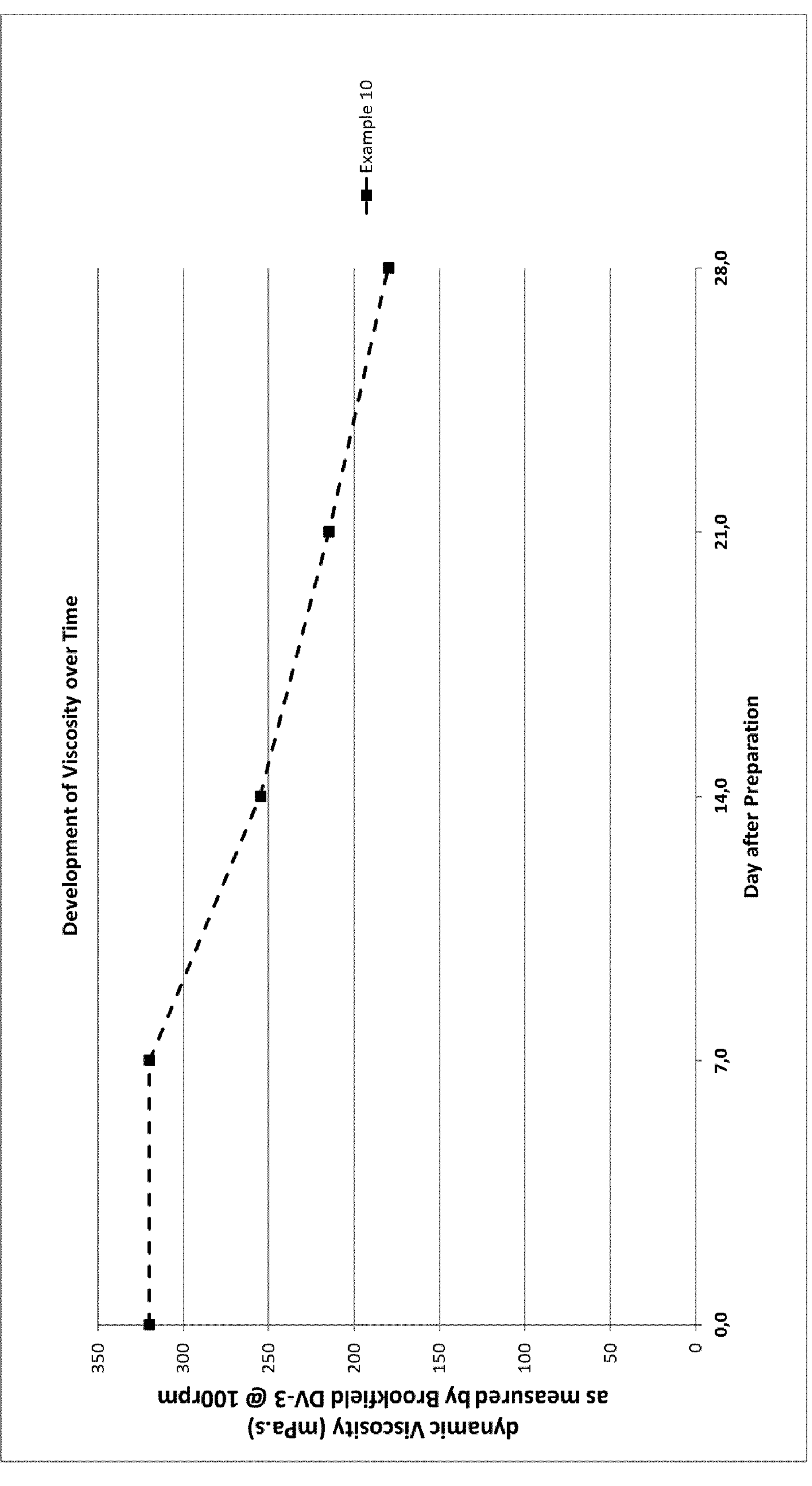
FIG. 2 is a graphic representation of the viscosity evolution over time of the milk of lime containing different amounts of xylitol with a polymer dispersant.

The viscosity is measured by Brookfield DV-3 Rheometer at 100 rpm with the measurement taken on the 30th second after the rheometer motor was turned on. The used 200 $cm^3$ sample is only shaken by hand for homogenization before the measurement, but left otherwise undisturbed. Results over 28 days are given in FIG. 2.

Comparative Example 1.—Preparation of a Milk of Lime Containing 0.07 wt % Fructose and Glucose and 0.08 wt % Polymer Dispersant 2000 g of tap water are placed in a 5 $dm^3$ plastic beaker. 5.4 g invert sugar syrup with a dissolved, total carbohydrate content of 60 wt %, containing sucrose, fructose and glucose in equal amounts, are added to the water and dissolved by gentle agitation with a 3-bladed propeller stirrer, turning at 300 rpm during 15 min.

1636 g of the same dry lime hydrate as Example 1 with a BET specific surface area of 10.3 $m^2/g$ is added to the water and dispersed by the same gentle agitation during 30 min into a homogeneous suspension of 45 wt % solid content with respect to the weight of the milk of lime. The total content of carbohydrate is thus 0.23 wt % per weight dry hydrate (with respect to the weight of the fine hydrated lime particles), while the combined content in fructose & glucose is 0.15 wt % per weight dry hydrate (with respect to the weight of the fine hydrated lime particles) or 0.07 wt % per weight suspension (with respect to the weight of the milk of lime). The added dry hydrated lime particles have a particle size distribution with characteristic diameters such as follows: $d_{25}$ of 2.5 μm, $d_{50}$ of 9.9 μm, $d_{90}$ of 55.3 μm and $d_{98}$ of 99.8 μm.

The suspension is milled by a lab scale rotary bead mill with a (empty) volume of 1.4 $dm^3$ using yttrium-stabilized zirconium oxide beads with a mean diameter of 1.2 mm to obtain fine hydrated lime particles with a particle size distribution with characteristic diameters as follows: $d_{25}$ of 1.16 μm, $d_{50}$ of 2.72 μm, $d_{90}$ of 16.92 μm and $d_{98}$ of 24.05 μm.

To 2229 g of this suspension, 8.9 g of Chryso Neomere®Tech 646 are added under vigorous agitation with the same stirrer as above at 600 rpm for a concentration of 0.080 wt % non-volatile matter of Neomere®Tech 646 per mass of total suspension (with respect to the weight of the milk of lime).

The viscosity is measured by Brookfield DV-3 Rheometer at 100 rpm with the measurement taken on the 30$^{th}$ second after the rheometer motor was turned on. The used 200 $cm^3$ sample is only shaken by hand for homogenization before the measurement, but left otherwise undisturbed. Results over 28 days are given in FIG. 1.

Comparative Example 2.—Preparation of a Milk of Lime Containing 0.10 wt % Sucrose and 0.08 wt % Polymer Dispersant 2000 g of tap water are placed in a 5 $dm^3$ plastic beaker. 6. g sucrose (table sugar) are added to the water and dissolved by gentle agitation with a 3-bladed propeller stirrer, turning at 300 rpm during 15 min.

1636 g of the same dry hydrated lime particles as Example 1 with a BET specific surface area of 10.3 $m^2/g$ are added to the water and dispersed by the same gentle agitation during 30 min into a homogeneous suspension of 45 wt % solid content with respect to the weight of the milk of lime.

The content of sucrose is thus 0.23 wt % per weight dry hydrate (with respect to the weight of the fine hydrated lime particles) or 0.10 wt % per weight total suspension (with respect to the weight of the milk of lime). The added dry hydrated lime particles have a particle size distribution with characteristic diameters as follows: $d_{25}$ of 2.5 μm, $d_{50}$ of 9.9 μm, $d_{90}$ of 55.3 μm and $d_{98}$ of 99.8 μm.

The suspension is milled by a lab scale rotary bead mill with a (empty) volume of 1.4 $dm^3$ using yttrium-stabilized zirconium oxide beads with a mean diameter of 1.2 mm to obtain fine hydrated lime particles with a particle size distribution with characteristic diameters as follows: $d_{25}$ of 1.22 μm, $d_{50}$ of 3.15 μm, $d_{90}$ of 16.23 μm and $d_{98}$ of 38.44 μm.

To 2004 g of this suspension, 8.0 g of Chryso Neomere®Tech 646 are added under vigorous agitation with the same stirrer as above at 600 rpm for a concentration of 0.080 wt % non-volatile matter of Neomere®Tech 646 per mass of total suspension (with respect to the weight of the milk of lime).

Figure 4:
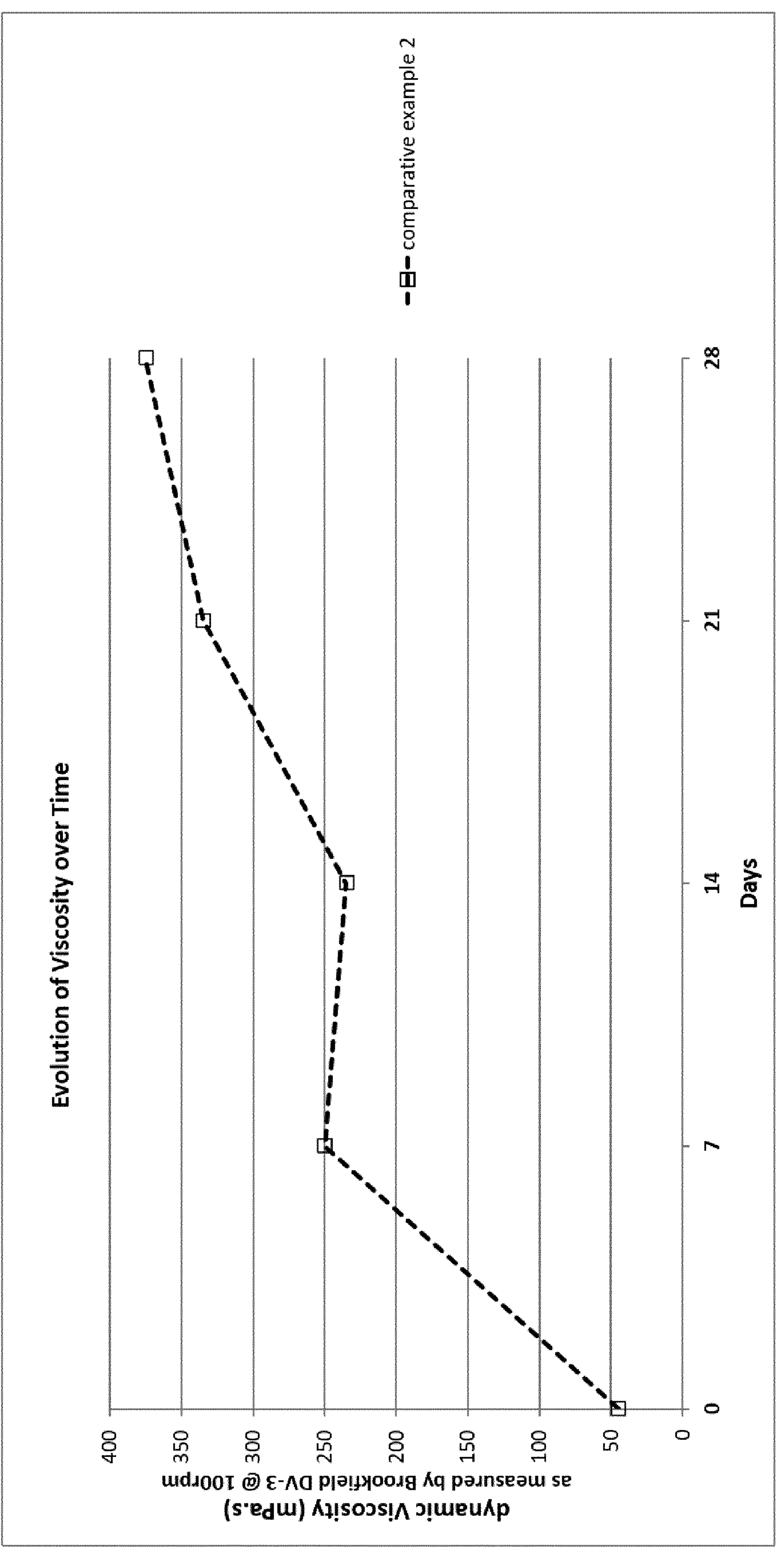
FIG. 4 is a graphic representation of the viscosity evolution over time of a comparative milk of lime containing different amounts of sucrose (saccharose) and a polymer dispersant.

The viscosity is measured by Brookfield DV-3 Rheometer at 100 rpm with the measurement taken on the 30$^{th}$ second after the rheometer motor was turned on. The used 200 $cm^3$ sample is only shaken by hand for homogenization before the measurement, but left otherwise undisturbed. Results over 28 days are given in FIG. 4.

Comparative Example 3—Preparation of a Milk of Lime as Described in Example 5.2 of WO 2020/0904607

6.0 g Rheosperse 4050 of the company Coatex and 2.4 g sucrose (i.e., saccharose) were added to 1800 g tap water and dissolved with a propeller stirrer at 300 rpm as described in WO 2020/0904607.

To this solution, 1200 g of dry hydrate of a sample of Supercalco 97 ("S97") were added and dispersed by the same agitation during 15 min into a homogeneous suspension of 40 wt % solid content with respect to the weight of the milk of lime.

The content of sucrose is thus 0.2 wt % with respect to the weight of the solid matter content of the milk of lime and the content of the Rheosperse dispersant on a non-volatile base is 0.2 wt % with respect to the weight of the solid matter content of the milk of lime (or 0.08 wt % with respect to the weight of the milk of lime).

The particle size distribution of the suspension was measured and the following results were obtained: $d_{25}$ of 1.99 μm, $d_{50}$ of 4.96 μm, $d_{90}$ of 47.3 μm and $d_{98}$ of 84.2 μm.

Figure 5:
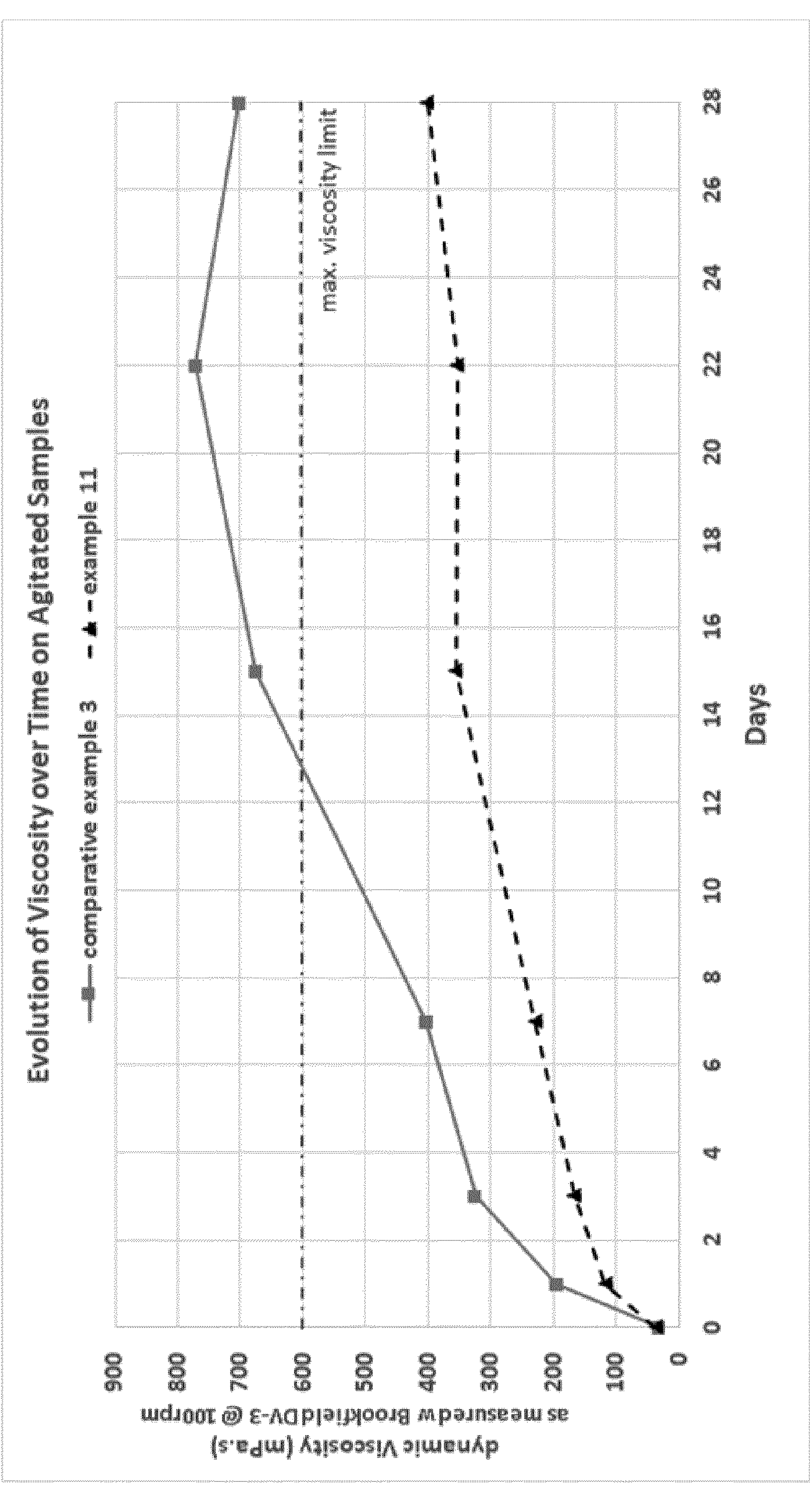
FIG. 5 is a graphic representation of the viscosity evolution over time of (i) a comparative milk of lime containing sucrose (saccharose) and a polymer dispersant, and (ii) the corresponding milk of lime according to the invention.

A 1000 $cm^3$ sample of the suspension was agitated for 1 hour/day and the viscosity monitored at regular intervals over 28 days (first measurement "day 0" was done directly after suspension preparation). Viscosity measurements were conducted with a Brookfield DV-3 Rheometer at rotation speeds of 100 rpm (suspension was only shaken by hand for homogenization before the measurement but left otherwise undisturbed). Results over 28 days are given in FIG. 5.

| Day after Preparation | Viscosity [mPa · s] (Brookfield DV-3 @ 100 rpm) |
|---|---|
| Day 0 | 31 |
| Day 1 | 195 |
| Day 3 | 324 |
| Day 7 | 403 |
| Day 15 | 675 |
| Day 22 | 771 |
| Day 28 | 702 |

It is observed that the viscosity increases very quickly (especially from "day 0" to "day 1"), exceeds 600 mPa·s after 15 days and continues to rise in the time thereafter to reach ~700 mPas after 28 days.

Example 11—Preparation of a Milk of Lime According to Invention, with Same Mass Dosage in First and Second Dispersants Equivalent to Example 5.2 of WO 2020/0904607

6.0 g Rheosperse 4050 of the company Coatex and 3.6 g invert sugar syrup (with a dissolved, total carbohydrate content of 70 wt %, containing sucrose, fructose and glucose in equal amounts) were added to 1800 g tap water and dissolved with a propeller stirrer at 300 rpm.

To this solution, 1200 g of the same dry hydrate sample as in Comparative Example 3 (Supercalco 97, "S97", same batch) were added and dispersed by the same agitation during 15 min into a homogeneous suspension of 40 wt % solid content with respect to the weight of the milk of lime.

The content of invert sugar is thus 0.2 wt % per weight dry hydrate (corresponding to 0.0533 wt % of glucose and fructose with respect to the weight of the milk of lime) and the content of the Rheosperse dispersant on a non-volatile base is 0.2 wt % with respect to the weight of the solid matter content of the milk of lime (or 0.08 wt % with respect to the weight of the suspension).

The particle size distribution of the suspension was measured and the following results were obtained: $d_{25}$ of 1.84 μm, $d_{50}$ of 4.61 μm, $d_{90}$ of 44.6 μm and $d_{98}$ of 78.3 μm.

A 1000 $cm^3$ sample of the suspension was agitated for 1 hour/day and the viscosity monitored at regular intervals over 28 days (first measurement "day 0" was done directly after suspension preparation). Viscosity measurements were conducted with a Brookfield DV-3 Rheometer at rotation speeds of 100 rpm (suspension was only shaken by hand for homogenization before the measurement but left otherwise undisturbed). Results over 28 days are given in FIG. 5.

| Day after Preparation | Viscosity [mPa · s] (Brookfield DV-3 @ 100 rpm) |
|---|---|
| Day 0 | 37 |
| Day 1 | 117 |
| Day 3 | 167 |
| Day 7 | 229 |
| Day 15 | 356 |
| Day 22 | 354 |
| Day 28 | 402 |

It is observed that the viscosity as measured by Brookfield DV-3 Rheometer at 100 rpm is significantly below 600 mPa·s after 15 days and remains roughly stable in the time thereafter, to reach ~400 mPas after 28 days.

It should be understood that the present invention is not limited to the described embodiments and that variations can be applied without going outside of the scope of the appended claims.

The invention claimed is:

1. Low viscosity milk of lime comprising fine lime particles in suspension in an aqueous phase containing at least a first dispersant and a second dispersant, said fine lime particles having a particle size distribution with a characteristic diameter $d_{25}$ equal to or lower than 2 μm as measured by laser diffraction with methanol as carrier solvent, said milk of lime containing a fine lime particles content comprised between 30 and 75 wt %, wherein the first dispersant is a dispersant polymer present at an amount of 0.03 to 0.24 wt % non-volatile matter, with respect to the solid matter content of the low viscosity milk of lime, and wherein the second dispersant is present at an amount of 0.10 to 1.0 wt % non-volatile matter with respect to the total weight of the low viscosity milk of lime and comprises either (i) sodium gluconate or gluconic acid, (ii) a mixture of sugar containing at least glucose and fructose, (iii) xylitol, wherein said first dispersant and said second dispersant are present together at an amount comprised between 0.11 and 1.15 wt % non-volatile matter with respect to the total weight of the low viscosity milk of lime, said low viscosity milk of lime showing a stable viscosity over 28 days lower than or equal to 600 mPa·s as measured by a Brookfield DV III Rheometer", with the suitable spindle according to the observed torque or viscosity, typically LV spindle No. 3 at 100 rpm with the measurement taken on the 30th second after the rheometer motor was turned on.

2. Low viscosity milk of lime according to claim 1, wherein fine lime particles have a particle size distribution with a characteristic diameter $d_{50}$ lower than or equal to 4 μm as measured by laser diffraction with methanol as carrier solvent.

3. Low viscosity milk of lime according to claim 1, wherein fine lime particles have a particle size distribution with a characteristic diameter $d_{90}$ lower than or equal to 15 μm as measured by laser diffraction with methanol as carrier solvent.

4. Low viscosity milk of lime according to claim 1, wherein fine lime particles have a particle size distribution with a characteristic diameter $d_{98}$ lower than or equal to 90 μm measured by laser diffraction with methanol as carrier solvent.

5. Low viscosity milk of lime according to claim 1, wherein said fine lime particles have a specific surface area measured by nitrogen adsorption manometry and calculated according to the BET (Brunauer, Emmett et Teller) method lower than or equal to 12 $m^2/g$.

6. Low viscosity milk of lime according to claim 1, having a density comprised between 1.3 $kg/dm^3$ and 1.4 $kg/dm^3$.

7. Low viscosity milk of lime according to claim 1, wherein said first dispersant is a polycarboxylic polyether copolymer.

8. Low viscosity milk of lime according to claim 7, wherein the polycarboxylic polyether copolymer has a main chain containing (meth)acrylate units and lateral chains comprising oxyethylene or oxypropylene groups.

9. Low viscosity milk of lime according to claim 1, wherein the fine particle content is higher than 40 wt % with respect to the total weight of the low viscosity milk of lime.

* * * * *